(12) United States Patent
Sasabe et al.

(10) Patent No.: US 7,638,078 B2
(45) Date of Patent: Dec. 29, 2009

(54) PROCESS FOR PRODUCTION OF HYDROGEL PARTICLES AND PROCESS FOR CUTTING OF HIGH-CONCENTRATION HYDROGEL SHEET

(75) Inventors: Masazumi Sasabe, Kakogawa (JP); Kozo Nogi, Kakogawa (JP); Shigeru Sakamoto, Himeji (JP); Yasuhiro Fujita, Himeji (JP); Akihiro Morita, Himeji (JP); Hiroaki Hattori, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 855 days.

(21) Appl. No.: 10/927,156

(22) Filed: Aug. 27, 2004

(65) Prior Publication Data

US 2005/0046069 A1    Mar. 3, 2005

(30) Foreign Application Priority Data

Sep. 1, 2003    (JP)    ............... 2003-309138

(51) Int. Cl.
*B26D 1/22* (2006.01)
*B26D 1/40* (2006.01)
*B26D 1/62* (2006.01)
*B29B 11/02* (2006.01)

(52) U.S. Cl. .................................... 264/140
(58) Field of Classification Search ................ 264/118, 264/130, 140, 143, 144, 146, 142
See application file for complete search history.

(56) References Cited

U.S. PATENT DOCUMENTS

| | | | | |
|---|---|---|---|---|
| 4,340,342 A | * | 7/1982 | Kim ........................... | 425/72.1 |
| 4,690,788 A | * | 9/1987 | Yada et al. .................. | 264/494 |
| 5,265,507 A | * | 11/1993 | Noda et al. .................. | 83/22 |
| 5,540,033 A | * | 7/1996 | Fox et al. ..................... | 53/425 |
| 6,140,395 A | * | 10/2000 | Hatsuda et al. ............. | 523/319 |
| 7,156,007 B1 | * | 1/2007 | Albin et al. .................... | 83/302 |
| 2002/0040095 A1 | * | 4/2002 | Dairoku et al. ............. | 524/832 |
| 2004/0110897 A1 | * | 6/2004 | Sakamoto et al. ........... | 524/832 |

FOREIGN PATENT DOCUMENTS

DE    195 18 645    9/1996

(Continued)

*Primary Examiner*—Leo B Tentoni
(74) *Attorney, Agent, or Firm*—Roylance, Abrams, Berdo & Goodman, L.L.P.

(57) ABSTRACT

An object of the present invention is to make it possible that: a high-concentration hydrogel sheet, which is suitable for production of high-performance water-absorbent resin particles, is cut efficiently without involving the adhesion to such as cutting-blades; and the subsequent disintegration operation is also successfully carried out; and hydrogel particles excellent in the quality and performances are efficiently produced. As a means of achieving this object, the process according to the present invention for production of hydrogel particles is a process for production of the hydrogel particles 14 from a high-concentration hydrogel sheet 10 and comprises: a step (a) of cutting a continuous sheet 10 of a crosslinked high-concentration hydrogel polymer of 50 to 80 weight % in solid component concentration every 10 to 100 cm lengthwise of the continuous sheet 10 while running it lengthwise, thereby obtaining cut pieces 12; and a step (b) of continuously supplying the cut pieces 12 (obtained from the step (a)) to a continuous disintegrator 40 to continuously carry out disintegration and discharge under conditions where the supply amount of the cut pieces 12 and the disintegrating and discharging abilities of the continuous disintegrator 40 satisfy (supply amount)≦(disintegrating and discharging abilities), thereby obtaining the hydrogel particles 14.

9 Claims, 4 Drawing Sheets

FOREIGN PATENT DOCUMENTS

| | | |
|---|---|---|
| DE | 19518645 C1 * | 9/1996 |
| EP | 0 827 443 | 2/1999 |
| EP | 0 925 836 | 6/1999 |
| EP | 1 116 564 | 7/2001 |
| JP | 61-110510 | 5/1986 |
| JP | 61 110510 | 5/1986 |
| JP | 61 110511 | 5/1986 |
| JP | 2001131218 A * | 5/2001 |
| JP | 2002-212204 | 7/2002 |
| WO | WO 96/36464 | 11/1996 |

* cited by examiner

PROCESS FOR PRODUCTION OF HYDROGEL PARTICLES AND PROCESS FOR CUTTING OF HIGH-CONCENTRATION HYDROGEL SHEET

BACKGROUND OF THE INVENTION

A. Technical Field

The present invention relates to a process for production of hydrogel particles and a process for cutting of a high-concentration hydrogel sheet. Specifically, the present invention relates to: a process for production of a particulate hydrogel comprising the steps of cutting and disintegrating a hydrogel sheet of a water-absorbent resin (having beforehand been produced in the shape of a sheet) in a process for production of water-absorbent resin particles; and a process for cutting of a high-concentration hydrogel sheet which process is applicable to the above process for production of a particulate hydrogel.

B. Background Art

An art for production of hydrogel particles, including the steps of producing a sheet of a hydrogel of a water-absorbent resin and then disintegrating this hydrogel sheet, is known as an art for production of water-absorbent resin particles which are widely utilized for such as absorbing materials for absorbent products such as disposable diapers.

In a patent document 1 below, there is proposed a process for continuous production of a high-concentration hydrogel sheet including the steps of: supplying an aqueous solution, containing a monomer component such as acrylic acid, onto an endless belt; and then polymerizing the monomer component in a state left static. There is also disclosed an art for obtaining hydrogel particles by disintegrating the high-concentration hydrogel sheet with a shearing type primary crusher or cutting and shearing mill. The above patent document states that a screen type disintegrator, which has a screen and makes the disintegration by shearing between a fixed blade and a rotary blade, is favorable as the disintegrator. The resultant hydrogel particles are dried or pulverized, whereby water-absorbent resin particles are obtained. The high-concentration hydrogel sheet does not form into a flat and smooth sheet, but is in a form such that dispersion in thickness with places or thicknesswise undulating or waving is caused by foaming-expansion due to boiling during the polymerization and by subsequent shrinkage. The above patent document states that the high-concentration hydrogel sheet of such a form has an advantage such that the disintegration is so easy to carry out that the water-absorbent resin particles are easy to produce.

In a patent document 2 below, there is disclosed an art for production of a small-pieces-shaped water-soluble polymer gel including the steps of: cutting a sheet of a water-soluble polymer gel into the shape of rectangles with a pair of roller type cutters; and then cutting them with a rotary blade and a fixed blade also in directions crossing at right angles to the roller type cutters. The fixed blade is disposed just under the rectangular sheets being discharged from the pair of roller type cutters. The rotary blade is disposed on the outer periphery of a columnar. revolution body along its axial directions and interposes the rectangular sheets between the rotary blade and the fixed blade with the revolution of the revolution body to thereby cut the rectangular sheets. The above patent document states that even a hard polymer gel can easily be formed into small pieces and that the cohesion between these small pieces also occurs little.

In a patent document 3 below, there is disclosed an art for obtaining rectangular gel pieces including the steps of: running a continuous sheet of a hydrous polymer gel; and, in a nip clearance between a cutting roll and an opposite roll (which are disposed on the upside and downside of the continuous sheet), slitting the continuous sheet lengthwise by a disk-shaped cutter (provided to the cutting roll) to divide the continuous sheet widthwise, and cutting the continuous sheet off lengthwise every definite interval in such a manner that it is scraped off by a rectangular-plate-shaped rotary blade which is provided to the same cutting roll and extends in its axial directions. It is also disclosed that the resultant gel pieces are, for example, finely pulverized, whereby water-absorbent resin particles are obtained. It is stated that the gel pieces are successfully obtained even from a soft polymer gel sheet without its adhesion to the cutting blades.

[Patent Document 1] JP-A-212204/2002 (Kokai)
[Patent Document 2] JP-A-110510/1986 (Kokai)
[Patent Document 3] European Patent Specification No. 0827443B1

As to the prior arts for cutting of the hydrogel sheet, the adhesion of the hydrogel to such as the cutting blades cannot sufficiently be prevented. Because of the adhering and clogging phenomena of the hydrogel, the operation has been stopped, or it has been necessary to often carry out such as operation of removing the adhered materials.

Particularly, in the case of such a high-concentration hydrogel sheet as disclosed in the patent document 1 above, because, as aforementioned, this sheet has the dispersion in thickness or the thicknesswise undulating or waving and further because this sheet has very strong adhesion or tackiness, there is a problem that this sheet tends to adhere to the cutter or that the cut pieces tend to cohere again.

In the art of the patent document 1 above, the high-concentration hydrogel sheet is disintegrated with the shearing type primary crusher or cutting and shearing mill. However, if an attempt is made to disintegrate the high-concentration hydrogel sheet while continuously supplying this sheet (being continuously produced) immediately to the disintegrator, then the adhesion and clogging to such as screen in the disintegrator tend to be caused, also because the high-concentration hydrogel sheet has just been produced and is therefore in a high-temperature state.

As to the cutting art of the patent document 2 above, because the rectangular sheets having been cut by the one pair of roller type cutters come straight down onto the revolution body as provided with the rotary blade, the small pieces having been cut by the rotary blade and the fixed blade tend to remain adhering to the surface of the revolution body. If the small pieces accumulate on the outer periphery of the revolution body, then the cutting operation unfavorably becomes impossible.

In the patent document 2 above, it is proposed that the temperature should be dropped by cooling the gel sheet down to the range of about 10 to about 30° C. in order to prevent the adhesion. However, in order for the gel sheet (having a possibility of coming into a high-temperature state near 100° C. just after having been produced) to sufficiently be cooled no later than being fed to the cutter, it is necessary that the gel sheet is run a long distance from its production device to the cutter, or that a cooling device is added on the running course, or that the running speed is made slow to thus secure the cooling time. Therefore, costs of facilities increase, and the production efficiency deteriorates.

As to the cutting art of the patent document 3 above, because the continuous sheet is cut in such a manner that it is scraped off with the plate-shaped rotary blade by making this blade bite into the continuous sheet at a stroke in the nip clearance between rollers, it is difficult to surely cut the whole thickness of the continuous sheet. Particularly, in the case of such a high-concentration hydrogel sheet as has the dispersion in thickness or the thicknesswise undulating or waving, its cutting is difficult. Because the continuous sheet is run in a state nipped (i.e. interposed) between the cutting roller and the opposite roller, the continuous sheet tends to adhere to surfaces of the cutting roller and opposite roller. Particularly, the cut gel pieces result in tending to unfavorably adhere to the opposite roller.

SUMMARY OF THE INVENTION

A. Object of the Invention

An object of the present invention is to make it possible that: the aforementioned continuous high-concentration hydrogel sheet, which is suitable for the production of high-performance water-absorbent resin particles, is cut efficiently without involving the adhesion to such as cutting-blades; and the subsequent disintegration operation is also successfully carried out; and hydrogel particles excellent in the quality and performances are efficiently produced.

B. Disclosure of the Invention

A process according to the present invention for production of hydrogel particles is a process for production of the hydrogel particles from a high-concentration hydrogel sheet and comprises: a step (a) of cutting a continuous sheet of a crosslinked high-concentration hydrogel polymer of 50 to 80 weight % in solid component concentration every 10 to 100 cm lengthwise of the continuous sheet while running it lengthwise, thereby obtaining cut pieces; and a step (b) of continuously supplying the cut pieces (obtained from the step (a)) to a continuous disintegrator to continuously carry out disintegration and discharge under conditions where the supply amount of the cut pieces and the disintegrating and discharging abilities of the continuous disintegrator satisfy (supply amount)≦(disintegrating and discharging abilities), thereby obtaining the hydrogel particles.

[High-concentration Hydrogel Sheet]:

Basically, it is possible to apply arts common to arts for production of crosslinked high-concentration hydrogel polymer sheets which are adopted in conventional arts for production of water-absorbent resin particles. Of the aforementioned arts as disclosed in JP-A-212204/2002 (Kokai), an applicable one is the art for production of the high-concentration hydrogel sheet by the process in which the aqueous monomer solution having been supplied onto the endless belt is continuously polymerized in a state left static.

<Aqueous Monomer Solution>:

In the aqueous monomer solution as used for the production of the high-concentration hydrogel sheet, there are contained, besides the monomer component, other components such as unsaturated monomer components (e.g. internal-crosslinking agents) and polymerization initiators.

Examples of the monomer component include: anionic unsaturated monomers (e.g. (meth)acrylic acid, (anhydrous) maleic acid, itaconic acid, cinnamic acid, vinylsulfonic acid, allyltoluenesulfonic acid, vinyltoluenesulfonic acid, styrenesulfonic acid, 2-(meth)acrylamido-2-methylpropanesulfonic acid, 2-(meth)acryloylethanesulfonic acid, 2-(meth)acryloylpropanesulfonic acid, 2-hydroxyethyl (meth)acryloyl phosphate) and their salts; mercaptan-group-containing unsaturated monomers; phenolic-hydroxyl-group-containing unsaturated monomers; amide-group-containing unsaturated monomers (e.g. (meth)acrylamide, N-ethyl(meth)acrylamide, N,N-dimethyl(meth)acrylamide); and amino-group-containing unsaturated monomers (e.g. N,N-dimethylaminoethyl (meth)acrylate, N,N-dimethylaminopropyl (meth) acrylate, N,N-dimethylaminopropyl(meth)acrylamide). These monomers may be used either alone respectively or in appropriate combinations with each other. However, from the viewpoints of: performances of the resultant water-absorbent resin; and costs; acrylic acid and/or its salts (e.g. salts of such as sodium, lithium, potassium, ammonium, and amines; above all, the sodium salt is favorable from the viewpoint of costs) are desirably used as the main components. Favorably, the acrylic acid and/or its salts are used in an amount of not smaller than 70 mol %, more favorably not smaller than 80 mol %, still more favorably not smaller than 90 mol %, particularly favorably not smaller than 95 mol %, relative to the entire monomer components.

As to the internal-crosslinking agent, it is preferred that a compound having at least two polymerizable unsaturated groups and/or at least two reactive groups per molecule is caused to copolymerize or react as the internal-crosslinking agent. Specific examples of these internal-crosslinking agents include: N,N'-methylenebis(meth)acrylamide, (poly) ethylene glycol di(meth)acrylate, (poly)propylene glycol di(meth)acrylate, trimethylolpropane tri(meth)acrylate, glycerol tri(meth)acrylate, glycerol acrylate methacrylate, ethylene-oxide-modified trimethylolpropane tri(meth)acrylate, pentaerythritol hexa(meth)acrylate, triallyl cyanurate, triallyl isocyanurate, triallyl phosphate, triallylamine, poly(meth)allyloxyalkanes, (poly)ethylene glycol diglycidyl ether, glycerol diglycidyl ether, ethylene glycol, polyethylene glycol, propylene glycol, glycerol, pentaerythritol, ethylenediamine, ethylene carbonate, propylene carbonate, and glycidyl (meth) acrylate.

The amount of the internal-crosslinking agent as used is favorably in the range of 0.005 to 2 mol %, more favorably 0.02 to 0.5 mol %, still more favorably 0.04 to 0.2 mol %, relative to the monomer component. In the case where the amount of the internal-crosslinking agent as used is smaller than 0.005 mol % or larger than 2 mol %, there is a possibility that no sufficient absorption properties can be obtained.

The polymerization initiator is free of especial limitation. Examples of usable ones include: thermal initiators (e.g. the following persulfates: sodium persulfate, potassium persulfate, ammonium persulfate; the following peroxides: hydrogen peroxide, t-butyl peroxide, methyl ethyl ketone peroxide; and the following azo compounds: azonitrile compounds, azoamidine compounds, cyclic azoamidine compounds, azoamide compounds, alkylazo compounds, 2,2'-azobis(2-amidinopropane) dihydrochloride, 2,2'-azobis[2-(2-imidazolin-2-yl)propane] dihydrochloride); and photoinitiators (e.g. benzoin derivatives, benzyl derivatives, acetophenone derivatives, benzophenone derivatives, and azo compounds). From the viewpoints of costs and the ability to reduce the residual monomer content, the persulfates are favorable. In addition, the use of the photoinitiators and ultraviolet rays is also a favorable method. More favorable is the joint use of the photoinitiators and the thermal initiators.

Although not especially limited, the concentration of the monomer component in the aqueous monomer solution is favorably not less than 30 weight %, more favorably not less than 35 weight %, still more favorably not less than 40 weight %, yet still more favorably not less than 45 weight %, yet still more favorably not less than 50 weight %, yet still more favorably not less than 55 weight %, yet still more favorably in the range of 30 to 70 weight %, yet still more favorably 35 to 60 weight %, yet still more favorably 40 to 60 weight %. In the case where the above concentration is less than 30 weight %, the productivity is low. In the case where the above concentration is more than 70 weight %, inferior results are provided with regard to the absorption capacity.

To the reaction system there can be added such as: various foaming agents (e.g. (hydrogen)carbonates, carbon dioxide, azo compounds, inert organic solvents); hydrophilic polymers (e.g. starch, cellulose, starch derivatives, cellulose derivatives, polyvinyl alcohol, poly(acrylic acid) (salts), crosslinked poly(acrylic acid) (salts)); various surfactants; chelating agents; and chain transfer agents (e.g. hypophosphorous acid (salts)). Besides, inorganic powders may be added.

<Continuous Static Polymerization>:

It is possible to apply conventional continuous static polymerization arts which are utilized for arts for production of water-absorbent resin particles. For example, the aforementioned arts as disclosed in the aforementioned patent document 1 are applicable.

For structures of the endless belt and other polymerization devices, there are adopted arts common to conventional continuous static polymerization. The polymerization devices can be provided with such as heating and cooling mechanisms, ultraviolet irradiation devices, and pressure reduction devices.

The polymerization is usually carried out under normal pressure. However, it is also favorable to carry out it while distilling water off under reduced pressure in order to lower the boiling temperature of the polymerization system. More favorably for such as facilitation of operation, the polymerization is carried out under normal pressure.

Although not especially limited, the temperature of the monomer being supplied to the polymerization is usually not lower than 50° C., favorably not lower than 60° C., more favorably not lower than 70° C., still more favorably not lower than 80° C., yet still more favorably not lower than 90° C., yet still more favorably in the range of 80 to 105° C., most favorably 90 to 100° C. In the case where the above temperature is lower than 50° C., not only is the productivity low due to the extension of the induction period and polymerization time, but also inferior results are provided with regard to the physical properties of the water-absorbent resin. Incidentally, the polymerization time refers to a time of from the completion of polymerization initiation conditions (including the supply completion of the aqueous monomer solution) till the attainment to the peak temperature.

The polymerization initiation temperature is usually not lower than 50° C., favorably not lower than 60° C., more favorably not lower than 70° C., still more favorably not lower than 80° C., yet still more favorably not lower than 90° C., yet still more favorably in the range of 80 to 105° C., most favorably 90 to 100° C. In the case where the polymerization initiation temperature is lower than 50° C., not only is the productivity low due to the extension of the induction period and polymerization time, but also inferior results are provided with regard to the physical properties of the water-absorbent resin. In the case where the polymerization initiation temperature is higher than 105° C., there is a possibility that no sufficient foaming or extension may occur. The polymerization initiation temperature can be observed from such as clouding, viscosity rise, and temperature rise of the aqueous monomer solution.

Although not especially limited, the highest temperature during the polymerization is favorably not higher than 150° C., more favorably not higher than 140° C., still more favorably not higher than 130° C., yet still more favorably not higher than 120° C., yet still more favorably not higher than 115° C. In the case where the above highest temperature is higher than 150° C., there are disadvantages in that the physical properties of the resultant polymer or hydrogel or water-absorbent resin particles are greatly deteriorated.

The difference $\alpha T$ between the polymerization initiation temperature and the highest temperature during the polymerization is favorably not more than 70° C., more favorably not more than 60° C., still more favorably not more than 50° C., yet still more favorably not more than 40° C., yet still more favorably not more than 30° C., most favorably not more than 25° C. In the case where the $\Delta T$ is more than 70° C., there are disadvantages in that the physical properties of the resultant polymer or hydrogel or water-absorbent resin particles are deteriorated.

Although not especially limited, the polymerization time is favorably not more than 5 minutes, more favorably not more than 3 minutes, still more favorably less than 3 minutes, yet still more favorably not more than 2 minutes, yet still more favorably not more than 1 minute. In the case where the polymerization time is more than 5 minutes, there are disadvantages in that the productivity is low.

In this polymerization process, after the polymerization initiation, the temperature of the system rapidly rises and then reaches the boiling point in a low polymerization conversion, for example, of 10 to 20 mol %, and then the polymerization proceeds while emitting water vapor to increase the solid component concentration. The foaming-expansion and shrinkage are caused during the polymerization. The polymerization system is caused to foam by water vapor pressure due to the boiling during the polymerization, so that the surface area increases. In addition, the volatilization of the water vapor is thereby promoted, and then the shrinkage is caused. The hydrogel sheet of such a form has good releasibility from such as the endless belt (which is a polymerization device) and also is easy to disintegrate into particles.

The expansion magnification of the hydrogel sheet during the polymerization is favorably not less than 2 magnifications, more favorably not less than 3 magnifications, still more favorably not less than 5 magnifications, yet still more favorably not less than 10 magnifications, yet still more favorably not less than 20 magnifications. Because the polymerization system is extended during the polymerization, the polymerization proceeds while the polymerization system is extended.

A high-performance hydrogel or high-performance water-absorbent resin particles are obtained by carrying out the polymerization at high temperature since the initiation of the polymerization. The polymerization under normal pressure is polymerization favorably such that the temperature has already reached not lower than 100° C. in a polymerization conversion of 40 mol % and is still not lower than 100° C. even in a polymerization conversion of 50 mol %, more favorably such that the temperature has already reached not lower than 100° C. in a polymerization conversion of 30 mol % and is still not lower than 100° C. even in a polymerization conversion of 50 mol %, and most favorably such that the temperature has already reached not lower than 100° C. in a polymerization conversion of 20 mol % and is still not lower than 100° C. even in a polymerization conversion of 50 mol %. The case of the reduced-pressure polymerization is, similarly, polymerization favorably such that the temperature has already reached the boiling temperature in a polymerization conversion of 40 mol % and is still the boiling temperature even in a polymerization conversion of 50 mol %, more favorably such that the temperature has already reached the boiling temperature in a polymerization conversion of 30 mol % and is still the boiling temperature even in a polymerization conversion of 50 mol %, and most favorably such that the temperature has already reached the boiling temperature in a polymerization conversion of 20 mol % and is still the boiling temperature even in a polymerization conversion of 50 mol %.

The polymerization is carried out desirably while water is vaporized so that the ratio between the solid component concentration of the hydrogel being formed by the polymerization and the solid component concentration of the aqueous monomer solution (concentrating ratio) will be in the range of favorably not less than 1.10, more favorably not less than 1.15, still more favorably not less than 1.20, yet still more favorably not less than 1.25. In the case where the concentrating ratio is less than 1.10, the utilization of the polymerization heat cannot be said to be sufficient. Hereupon, the solid component of the aqueous monomer solution refers to the monomer and other additives and does not include water or solvent.

As to the produced hydrogel sheet, its solid component concentration is in the range of 50 to 80 weight %, but more favorably it is in the range of 52 to 75 weight %, still more favorably 55 to 70 weight %. In the case where the solid component concentration is too high, there is seen the performance deterioration, namely, the deterioration of the absorption capacity and the increase of the extractable component content. In the case where the solid component concentration is too low, a heavy load is imposed on the drying which is a subsequent step.

[Continuous Sheet]:

As to the continuous sheet of the crosslinked high-concentration hydrogel polymer which is produced in the above way, its size varies with production devices and production conditions. Usually, the width of the continuous sheet is in the range of from 10 cm up to 3 m. The thickness of the continuous sheet comes in the range of 1 to 50 mm, though considerably dispersing with places. In addition, the continuous sheet is not in the form of a flat and smooth sheet, but in a form such that the undulating or waving is present.

The continuous sheet is supplied to the cutting step by being run lengthwise. Although being limited by such as conditions for production of the high-concentration hydrogel sheet, the running speed of the continuous sheet is usually set in the range of 2 to 20 m/minute.

Just after having been produced by the aforementioned continuous static polymerization, the continuous sheet is usually in a high-temperature state of about 60 to about 100° C. However, in the present invention, the continuous sheet in this high-temperature state can be supplied to the cutting step. It is also possible to supply the continuous sheet to the cutting step in a high-temperature state of not lower than 70° C. or not lower than 80° C.

[Cut Pieces]:

The size conditions of the cut pieces being produced from the continuous sheet vary with use purposes and demanded performances of the hydrogel particles or with properties of the high-concentration hydrogel sheet. Particularly desirably, the cut pieces have sizes and shapes which are appropriate for the disintegration step for production of the hydrogel particles. These sizes and shapes are desirably such that the cut pieces can be supplied successfully to the continuous disintegrator by injection.

The shape of the cut pieces is generally a rectangular shape. However, it will do even if it is not a strict rectangle but a parallelogram or rhombus near a rectangle, depending on cutting methods. The outer periphery is usually constituted by straight lines, but there is also a case where a curve is included.

The sizes of the cut pieces can be set in the range of 10 to 100 cm on longer edge sides and in the range of 10 to 100 cm on shorter edge sides.

In addition, though depending on the continuous disintegrator being used, for example, if the width of the continuous sheet is in the range of 10 to 300 cm, favorably 10 to 200 cm, more favorably 10 to 100 cm, then it is also possible to obtain the cut pieces by cutting the continuous sheet off every definite size only lengthwise without cutting it off widthwise.

[Cutting off Lengthwise]:

When the cut pieces are produced from the continuous sheet, if the width of the continuous sheet is narrow, then the objective cut pieces are obtained by merely cutting the continuous sheet off lengthwise every predetermined interval. Usually, the cutting interval lengthwise of the continuous sheet is set in accordance with the sizes of the objective cut pieces on their longer edge sides. It is also possible that the cutting interval lengthwise of the continuous sheet is set in accordance with the sizes of the cut pieces on their shorter edge sides. For example, when the continuous sheet is cut off every definite size only lengthwise without cutting it off widthwise, then the cutting interval lengthwise of the continuous sheet can be set in the range of 10 to 100 cm, favorably 10 to 50 cm.

As a means of the cutting off lengthwise, there can be adopted a cutting means in which the continuous sheet is cut by meshing between cutting blades. The cutting by meshing is an art in which, when the cutting blades relatively migrate to pass each other at their edges, the continuous sheet existing therebetween is cut.

Specifically, the following cutting means can be adopted.

<Fixed Blade and Rotary Blade>:

The continuous sheet is cut off lengthwise every definite interval by slitting the continuous sheet widthwise by meshing between a fixed blade and a rotary blade, wherein the fixed blade is fixed and disposed crossing widthwise on one face side of the continuous sheet, and wherein the rotary blade rotates on the opposite face side of the continuous sheet, around a widthwise crossing axis as a rotational center, and along the running direction of the continuous sheet.

As the fixed blade, there can be disposed a thin band-plate-shaped blade in a position nearly contacting with one face of the continuous sheet so as to cross at right angles to the running direction of the continuous sheet.

The rotary blade can be provided on the outer periphery of a revolution body being rotationally driven by such as motor so that the blade edge may project diameterwise. It is also possible that the rotary blade is set in at least two places in a peripheral direction of the revolution body. The cutting interval of the continuous sheet can be controlled by adjusting the revolution speed of the revolution body (i.e. revolution speed of the rotary blade) and the running speed of the continuous sheet. Usually, the revolution speed of the rotary blade can be set in the range of up to about 100 rpm. It is also possible to make a difference in revolution speed of the rotary blade between while the rotary blade is cutting the continuous sheet and while the rotary blade is passing a position apart from the continuous sheet. For example, it is possible that, while cutting the continuous sheet, the rotary blade is caused to migrate synchronously with the running of the continuous sheet, and that, after the cutting, the rotary blade is caused to rapidly migrate, thereby preventing the adhesion of the continuous sheet or cut pieces and also getting ready for the next cutting operation. A cutter, synchronizing the migration speed of the material to be cut with the migration speed of the cutting blades, is called synchronous type, and such as a low-inertia servomotor is used for the motive power of the rotary blade.

A flat band-plate-shaped rotary blade is usable as the rotary blade. The edge of the rotary blade is disposed so as to pass a position, having opened a slight clearance with the edge of the fixed blade, in a way of meshing therewith. This clearance between these blade edges can be set in the range of 0.005 to 0.05 mm, favorably 0.01 to 0.04 mm, more favorably 0.01 to 0.03 mm. In the case where this clearance is too narrow, the blade edges unfavorably collide together due to the influence of such as temperature variation to thus undergo abrasion and damage. In the case where the above clearance is too broad, the thin continuous sheet is difficult to cut.

The edge of the rotary blade and the edge of the fixed blade may be disposed either in parallel to each other or with an inclination to each other. The edge of the rotary blade can be inclined to the straightedge of the fixed blade. In this case, it follows that the edge of the rotary blade is inclined along a cylindrical plane, so the blade edge or the rotary blade is spirally disposed. For lessening the cutting resistance, it is generally favorable that the inclination angle of the rotary blade is set for a comparatively small one in the case of the thin continuous sheet and for a comparatively large one in the case of the thick continuous sheet. The favorable inclination angle depends also on whether the continuous sheet is hard or soft. Usually, the inclination angle can be set in the range of about 1 to about 2 degrees.

If the continuous sheet is cut by the edge of the fixed blade and the edge of the rotary blade which blades are disposed with an inclination to each other, then the meshing position where the edges of the fixed blade and of the rotary blade close most to each other migrates gradually from an end to the other end widthwise of the continuous sheet, so that a slit widthwise crossing the continuous sheet is formed. Thereby the continuous sheet is smoothly and efficiently cut. Because the cutting position at each point of time is substantially a point position in one place, the surfaces of the fixed blade and of the rotary blade can be prevented from being pressed on the continuous sheet for a long time to thus unfavorably undergo the adhesion.

As materials of the fixed blade and of the rotary blade, there can be adopted conventional blade materials. Examples thereof include carbon steel, Swedish steel, bearing steel, ceramics, spring steel, powder metallurgy process (P/M) high-speed steel, die steel, alloy tool steel, super alloy, high-speed steel, stellite, stainless steel, and ferrotic steel. When the corrosion resistance is demanded, martensite type stainless (e.g. SUS440C, SUS420J2) is favorable.

<Rotary Blade and Rotary Blade>:

It is also possible to dispose the aforementioned rotary blades face to face on both the surface and back face sides of the continuous sheet to thus cut the continuous sheet by meshing between these rotary blades.

Also in this case, the rotary blades on both face sides of the continuous sheet may be disposed either in parallel to each other or with an inclination to each other. The inclination angles of the rotary blades on both face sides may differ from each other.

The materials and structural conditions of the rotary blades can be set in accordance with the case of the aforementioned meshing between the fixed blade and the rotary blade.

<Adhesion Prevention>:

As to the members (e.g. cutting blades) constituting the cutter, it is possible that: in order to make the adhesion of the continuous sheet little, these members are constituted by fluororesin materials, or measures (e.g. fluororesin coating) to prevent the adhesion are taken only upon surfaces of the members. As the surface treatment for the adhesion prevention, there can be adopted resin (e.g. fluororesin) coating and others such as carbonizing, nitriding, dichromic treatment, atomlly treatment, redux treatment, tef-lock, tungsten spraying, hard chromium plating, and ceramic spraying.

It is also possible that the unevenness and/or grooves for the adhesion prevention are formed in surfaces of the cutting blades.

As the structure of the cutter, it is preferable for the adhesion prevention that such as structural members as few as possible, other than the members necessary for the cutting (e.g. the fixed blade and the rotary blade), are present in the range through which the continuous sheet and the cut pieces pass. For example, it is preferable to open the peripheries of the cut places without providing a cover surrounding the cut places.

[Cutting off Widthwise]:

When the width of the continuous sheet is broader than the size of the objective cut pieces, it is effective to cut the continuous sheet off widthwise every definite interval.

The widthwise interval of the cutting can be set in the range of 10 to 100 cm.

The cutting off widthwise of the continuous sheet is possible either of before and after carrying out the cutting off lengthwise. Usually, it is easier operation that the cut pieces are obtained by carrying out the cutting off lengthwise every definite interval after having carried out the cutting off widthwise into definite widths.

As means of cutting the continuous sheet off widthwise, there can be applied various sheet-cutting means. Methods which involve little adhesion of the continuous sheet are favorable.

For example, the continuous sheet can be cut off widthwise at definite intervals by making lengthwise continuous slits in the continuous sheet with a rotary blade which revolves within a plane along the running direction of the continuous sheet. Such a cutting manner is called slitter manner. As cutting methods in this slitter manner, there are known the following three manners: razor cut, shear cut, and score cut. Any manner is adoptable. In point of the cutting ability, the shear cut and the score cut are excellent. Favorable are wrap-slitting razor cut, wrap-slitting shear cut, and wrap-slitting score cut in which the continuous sheet is cut in such a manner that it is wrapped around a receiving roll or lower blade as a pass line on which the continuous sheet to be cut passes.

In the score cut manner, a disk-shaped rotary blade is pressed on the continuous sheet running along the top surface of the receiving roll, whereby the continuous sheet sandwiched between the rotary blade and the receiving roll is cut in a way of being press-cut. Pressure can be applied by such as air pressure to structural members such as support axel of the disk-shaped rotary blade. The air pressure can be set in the range of 0.3 to 1.0 MPa, favorably 0.4 to 0.8 MPa, more favorably 0.4 to 0.6 MPa. In point of increasing the durability, it is favorable to make the surface material of the receiving roll harder than the material of the rotary blade.

In the shear cut manner, the continuous sheet is fed to a place where a side face of a disk-shaped rotary blade is made to pass in a way of meeting a side face of another rotary blade portion, so that the continuous sheet is cut by the shear action. The clearance between the one pair of blades which exercise the shear action can be set in the range of 5 to 15% of the thickness of the material to be cut. When a cutting blade is a one-side-edge blade, it can be used in light contact with the counterpart blade portion. It is also possible to apply contact pressure by a coil spring or air pressure.

Furthermore, cutting manners having been arranged by combining or modifying the aforementioned various cutting manners are also adopted.

Also as to means of the cutting off widthwise, similarly to the aforementioned means of the cutting off lengthwise, the measures (e.g. fluororesin coating) to prevent the adhesion can be taken upon surfaces of the cutting blades and/or upon surfaces of members which neighbor the cutting blades and have a possibility of undergoing the adhesion of the continuous sheet.

[Adhesion Prevention Medium]:

It is effective to prevent the adhesion of the continuous sheet by supplying an adhesion prevention medium to the fixed blade and the rotary blade for cutting the continuous sheet and to places which neighbor the cutting places and have a possibility of undergoing the contact of the continuous sheet (e.g. members for providing the fixed blade and the rotary blade). The adhesion prevention medium is effective in preventing the adhesion of the continuous sheet to members (e.g. cutting blades), and besides, in preventing the re-adhesion between cut sections of the cut continuous sheet.

Usable as the adhesion prevention medium is a liquid or gas which does not change the quality of the continuous sheet, deteriorate its performances, or exercise any bad influence on subsequent steps such as disintegration step. Specific examples thereof include water, warm water, and water vapor. Warm water of about 60 to about 90° C. is usable as the warm water.

The adhesion prevention medium can be supplied to predetermined places of the cutter by spraying means such as a spray and a shower nozzle. In the case of the rotary blade, it is also effective to supply the adhesion prevention medium to places which the rotary blade passes while revolving, even not to the cutting places.

The supply amount of the adhesion prevention medium differs according to conditions such as cutting manner and structures of the cutting blades.

For example, when water is used as the adhesion prevention medium, the supply amount of water can be set in the range of about 5 to about 2,000 g/min relative to the running speed of the continuous sheet of 2 to 15 m/min. Also in the case of the warm water, the same range of the supply amount is adoptable. In the case of the water vapor, its supply amount can be set in the range of about 25 to about 10,000 g/min allowing for the amount being lost due to such as scattering.

[Prevention of Heat Distortion]:

There is a possibility that the cutting means for cutting the continuous sheet (including the cutting blades such as rotary blade and fixed blade) may be distorted by heat being generated accompanying the cutting action. In the case where such heat distortion occurs, then, for example, the position, size, and shape of the cutting blades change slightly, and also the clearance between the cutting blades changes, so that their sharpness becomes bad, or that the cutting blades tend to undergo abrasion or damage.

Thus, the cutting means can be provided with means for preventing or inhibiting the occurrence of the heat distortion. As such heat distortion prevention means, it is possible to adopt the same mechanisms and devices as heat distortion prevention structures and heat distortion prevention devices which are provided to conventional cutters.

The aforementioned supply of the adhesion prevention medium can be used also as the heat distortion prevention means. The function of removing the heat from the cutting blades to thereby prevent the occurrence of the heat distortion can also be exercised by spraying the adhesion prevention medium to the cutting blades or bringing the adhesion prevention medium into contact with the cutting blades.

As the medium being used for the heat distortion prevention, there is preferred what has a high heat conductivity or a large heat capacity. There is preferred what has a property of not deteriorating the sharpness of the cutting blades.

Water, warm water, or water vapor is useful for the adhesion prevention as well as for the heat distortion prevention and is excellent also in point of the handling easiness. The supply amount of the water, warm water, or water vapor can be set in the range as previously described herein about the adhesion prevention. However, setting for a comparatively large amount in the aforementioned supply amount range is effective in sufficiently exercising the heat distortion prevention function not only for the purpose of the adhesion prevention.

[Posture of Continuous Sheet in Cutting It]:

The adhesion of the continuous sheet to the cutter and the cohesion between cut pieces can effectively be prevented by the posture or running direction of the continuous sheet in cutting it.

When being cut off lengthwise at definite intervals, the continuous sheet can be run vertically in a way of being hung from upward to downward. The fixed blade and the rotary blade, or the rotary blades, of the cutter are disposed face to face on both face sides of the vertically running continuous sheet. If the continuous sheet has been cut, then cut pieces having been separated from the continuous sheet fall due to their own weights and are therefore immediately separated without adhering to constitutional members (e.g. cutting blades) of the cutter. The re-adhesion between cut sections can be prevented. Because the continuous sheet migrates by falling due to its own weight even if no conveying roller or conveyor is used for the running of the continuous sheet, the adhesion of the continuous sheet to the conveying roller or conveyor also comes not to occur. If the cut pieces falling due to their own weights are received by an injection inlet (as set below the falling course) of the continuous disintegrator, then they can surely and efficiently be supplied to the continuous disintegrator.

It is also possible to cut the continuous sheet off lengthwise while running the continuous sheet in a direction inclined obliquely downward in place of running the continuous sheet entirely vertically downward. Also in this case, the vertical component of gravity, which works on the continuous sheet or cut pieces, smoothes the separation of the cut pieces from the continuous sheet. In addition, even if such as obliquely disposed conveyor is used for obliquely running the continuous sheet, the continuous sheet can be prevented from being pressed strongly on the surface of the conveyor and therefore comes to little adhere thereto.

[Disintegration of Cut Pieces]:

The cut pieces having been cut from the continuous sheet are supplied continuously to the continuous disintegrator to continuously carry out disintegration and discharge under conditions where the supply amount of the cut pieces and the disintegrating and discharging abilities of the continuous disintegrator satisfy (supply amount)≦(disintegrating and discharging abilities), thereby obtaining the hydrogel particles.

Usable as the continuous disintegrator are devices suitable for the continuous operation among various disintegrators utilized for conventional water-absorbent resin production arts.

For example, screw extrusion type disintegrators are usable. Basic structures of the screw extrusion type disintegrators are such that: a screw is revolving in a cylindrical barrel, and the cut pieces having been supplied to a material-injecting inlet of the barrel are conveyed forward while being disintegrated while being stirred with the revolution of the screw, and then the disintegrated pieces are extruded from a perforated extrusion plate as disposed at the front end of the barrel, whereby hydrogel particles having particle diameters corresponding to perforation diameters of the perforated extrusion plate are obtained. The larger the perforation diameters are, the larger particle diameters the resultant hydrogel particles have. However, there is a tendency such that: the perforation diameters of the perforated extrusion plate do not conform to the particle diameters of the resultant hydrogel particles, but hydrogel particles having particle diameters smaller than the perforation diameters are obtained. It is also possible to provide the inside of the perforated extrusion plate with rotary blades for cutting the material to be treated. As to detailed structures, appropriate combinations of the same structures as of already-known screw extrusion type disintegrators are adoptable. As specific examples of the screw extrusion type disintegrators, commercially available devices such as meat choppers (produced by Hiraga Kosakusho) and Dome Gran (produced by Fuji Paudal Co., Ltd.) are usable. Single-screw extruders with only one screw, and besides, twin-screw or quadruple-screw extruders, are adoptable. When the screw is a multiple one, the rotational directions of its component screws may be either the same or different.

As to the screw extrusion type disintegrators, the disintegration treatment amount or the discharge amount of the hydrogel particles per unit time can be changed by adjusting the revolution speed of the screw.

Also usable as the continuous disintegrator are: tower type pulverizers such as Rote Plex (produced by Hosokawa Mikron Co., Ltd.); screw type disintegrators such as Triple-Special-Screw Type Alpha (produced by Nippon Spindle Production); and twin-screw continuous rotating shear machines such as Gainax (registered trademark) Crusher (produced by Horai Co., Ltd.).

As to the continuous disintegrator, if the cut pieces are supplied thereto in an amount larger than its disintegrating and discharging abilities, then the cut pieces unfavorably stagnate inside the device, or its inside is unfavorably clogged up with the cut pieces. If the cut pieces are excessively stirred or kneaded in the device, then the properties of the hydrogel change or deteriorate.

Thus, the disintegration and discharge are continuously carried out under conditions where the supply amount of the cut pieces and the disintegrating and discharging abilities of the continuous disintegrator satisfy (supply amount)≦(disintegrating and discharging abilities).

The barrel of the continuous disintegrator can be provided with a temperature-conditioning mechanism for cooling or heating the material to be treated.

[Hydrogel Particles]:

The hydrogel particles being discharged from the continuous disintegrator are in a particulate state of the shape of such as spheres. The shape of the hydrogel particles differs according to such as disintegration conditions. Besides the spherical shape, there are other shapes of such as oval bodies and long cylindrical bodies, and further, irregular shapes. Even if the polymerization during the production involves foaming, most of the resultant particles are amorphous without containing any bubble, perhaps because the bubble size of the above foaming is comparatively large.

The particle diameters of the hydrogel particles can be set in the range of 0.5 to 3 mm.

The hydrogel particles are, as they are, usable for various uses. They are usable for uses such as sanitary articles and agriculture and horticulture. They may be mixed with fine particulate inorganic substances (e.g. bentonite, zeolite, silicon oxide) in order to secure the flowability of the particles.

By being dried, the hydrogel particles are utilizable as dry-state water-absorbent resin particles. Favorable used as the drying methods are drying methods in which the materials are made to well contact with hot air and/or heat transfer surfaces while being moved, such as stir-drying methods, fluidized-bed drying methods, and gas flow drying methods.

It is also possible that the hydrogel particles are treated with such as various treating liquids or dried after this treatment. Surface treatment such as surface crosslinking is also applicable.

C. Effects of the Invention

In the process according to the present invention for production of hydrogel particles, the hydrogel particles high in the quality and performances (from which water-absorbent resin particles excellent in water absorption performances are obtained) can efficiently be produced by the process comprising the steps of: cutting the continuous sheet of the crosslinked high-concentration hydrogel polymer off lengthwise every definite interval while running the continuous sheet lengthwise, thereby obtaining the cut pieces; and then continuously supplying the resultant cut pieces to the continuous disintegrator to continuously carry out the disintegration and discharge under conditions where the supply amount of the cut pieces and the disintegrating and discharging abilities of the continuous disintegrator satisfy (supply amount)≦(disintegrating and discharging abilities), thereby obtaining the hydrogel particles.

In the case where, being left as it is without being formed into the cut pieces, the continuous sheet of the hydrogel is supplied to the continuous disintegrator, then the supply amount of the continuous sheet must be made to conform exactly to the disintegrating and discharging abilities of the continuous disintegrator. In the case where the supply amount of the continuous sheet is too large, the continuous disintegrator is clogged up with the excessive continuous sheet. In the case where the supply amount of the continuous sheet is too small, then the continuous disintegrator exerts great tension on the continuous sheet to thus unfavorably break it, so that the continuous supply becomes impossible.

Because the supply amount (i.e. production amount) of the continuous sheet depends on production conditions (e.g. polymerization step), the disintegrating and discharging abilities of the continuous disintegrator must be brought into conformity with the supply amount of the continuous sheet. However, it involves difficulty selecting or designing the continuous disintegrator and therefore increases costs of facilities. There occurs a case where, if conditions for production of the continuous sheet change, then it becomes necessary to also change the continuous disintegrator.

Accordingly, in the present invention, it is effective that the disintegration and discharge are continuously carried out under conditions of (supply amount of cut pieces)≦(disintegrating and discharging abilities) after the cut pieces have been obtained from the continuous sheet.

If, as a method for cutting the continuous sheet off lengthwise, the continuous sheet is cut off lengthwise by the meshing between the fixed blade and the rotary blade while running the continuous sheet lengthwise (wherein the fixed blade is fixed and disposed crossing widthwise on one face side of the continuous sheet, and wherein the rotary blade rotates on the opposite face side of the continuous sheet, around a widthwise crossing axis as a rotational center, and along the running direction of the continuous sheet), then the continuous sheet can efficiently be cut without the unfavorable adhesion of the high-concentration hydrogel sheet (having a strong viscosity) to the cutting blades or other device members and without the unfavorable clogging of devices with this sheet.

These and other objects and the advantages of the present invention will be more fully apparent from the following detailed disclosure.

EXPLANATION OF THE SYMBOLS

10: Continuous sheet of high-concentration hydrogel
12: Cut piece
14: Hydrogel particle
20: Slitter
22: Receiving roll
23: Concave groove
24: Disk-shaped rotary blade
26, 38: Spraying nozzles
30: Cutter
32: Plate-shaped fixed blade
34: Revolution body.
36: Plate-shaped rotary blade
40: Continuous disintegrator
42: Injection inlet
46: Screw portion
48: Perforated extrusion plate
C: Meshing position
x: Clearance

DETAILED DESCRIPTION OF THE INVENTION

Hereinafter, detailed descriptions are given about the present invention. However, the scope of the present invention is not bound to these descriptions. And other than the following illustrations can also be carried out in the form of appropriate modifications of the following illustrations within the scope not departing from the spirit of the present invention.

Figure 1:
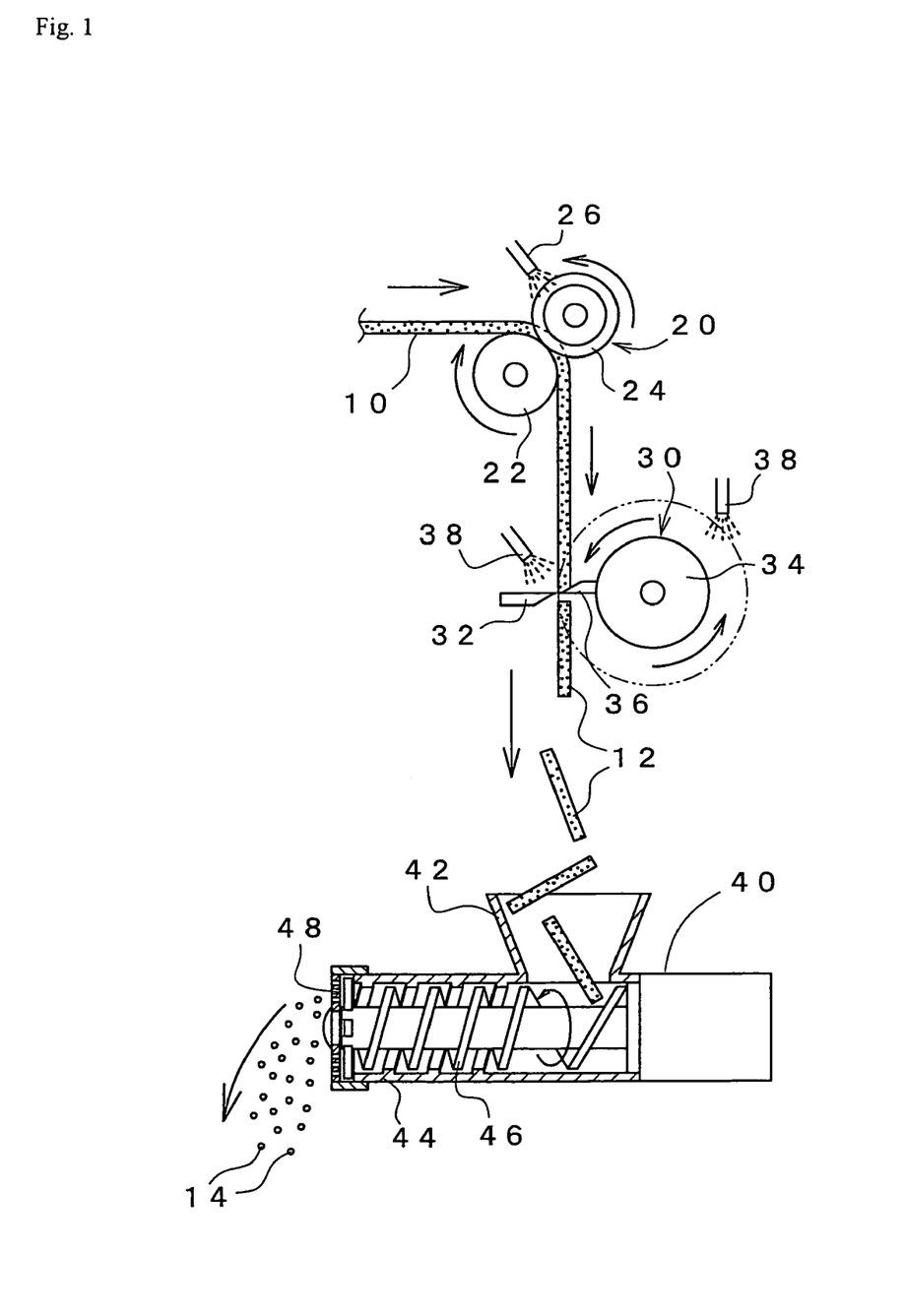
FIG. 1 is a whole constitutional view of a production device illustrating a mode for carrying out the present invention.
Figure 2:
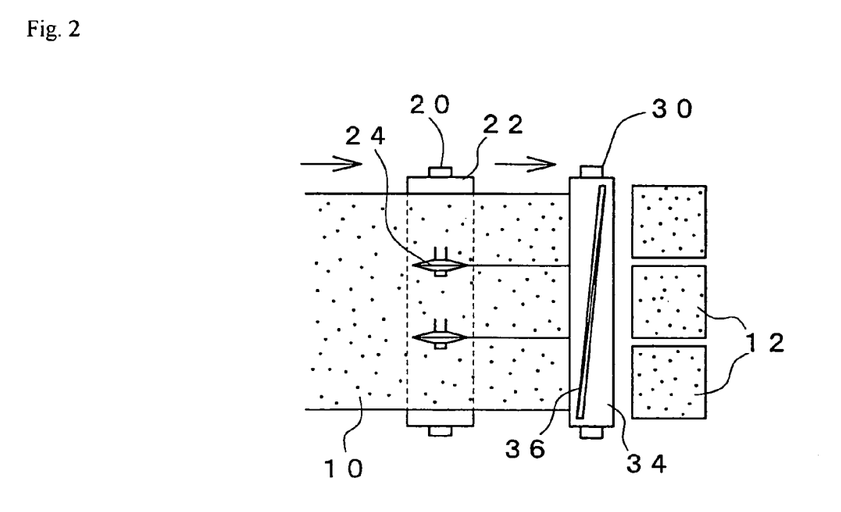
FIG. 2 is a front view seen from the surface side of the continuous sheet.

[Whole Constitution]:

In the mode for carrying out the present invention as illustrated in FIGS. 1 and 2, the hydrogel particles are produced from the high-concentration hydrogel sheet.

The hydrogel sheet 10 is the continuous sheet having been produced in a band shape by the continuous static polymerization method on the endless belt and is lengthwise continuously run by conveyance means such as conveyor. This sheet is indicated in a flat sheet shape in the drawing figures,. but, as a practical matter, has the thicknesswise waving or undulating, or a variation in thickness or also in width.

The continuous sheet 10 of the hydrogel, running in a horizontal direction, is supplied to a slitter 20. The running speed of the continuous sheet 10 being supplied to the slitter is 4.5 m/min, and the width of this continuous sheet 10 is about 80 cm.

<Slitter>:

The slitter 20 is provided with: a receiving roll 22 as disposed on the back face side of the continuous sheet 10; and a disk-shaped rotary blade 24 as disposed on the surface side of the continuous sheet 10. As is illustrated in FIG. 2, the disk-shaped rotary blade 24 is disposed in a number of at least two at intervals widthwise of the continuous sheet 10. The disk-shaped rotary blades 24 cut into the continuous sheet 10 to make lengthwise continuous slits in the continuous sheet 10, thereby cutting it off widthwise. The positions and number of the slits being formed in the continuous sheet 10 can be changed by the disposition number and intervals of the disk-shaped rotary blades 24.

Figure 5:
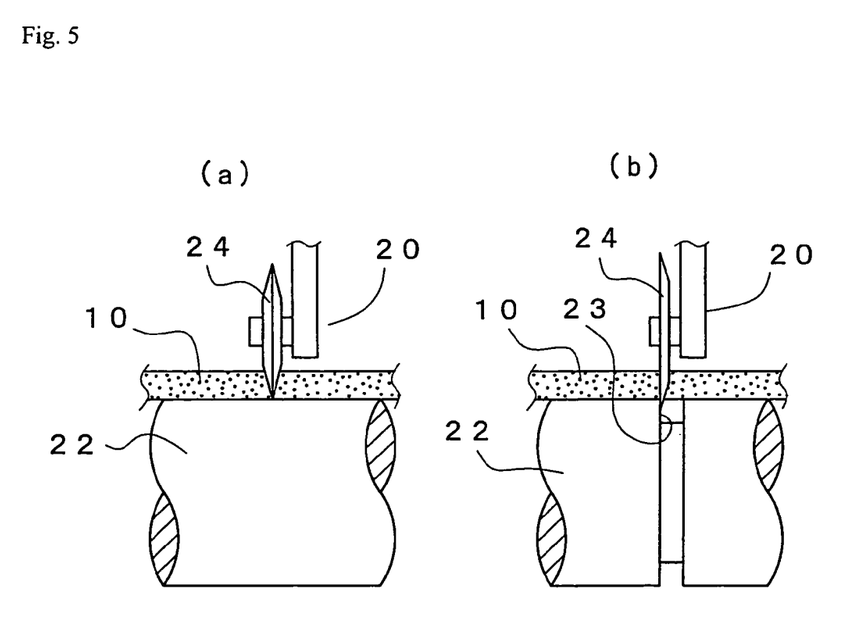
FIG. 5 shows detailed structural views of the slitters.

FIG. 5 illustrates detailed structural examples of the slitter 20. The structure of FIG. 5(a) is in the score cut manner of cutting into the continuous sheet 10 in a state where the edge of the disk-shaped rotary blade 24, which is made of a fluororesin-coated corrosion-resistant stainless steel and has a blade edge diameter of 7.5 cm, is disposed so as to almost contact with the surface of the receiving roll 22 which is similarly made of a fluororesin-coated corrosion-resistant stainless steel and is a shape of a cylinder having a diameter of 14 cm. The cutting is carried out by applying pressure by such as air pressure so as to press the disk-shaped rotary blade 24 from the upside of the continuous sheet 10.

The structure of FIG. 5(b) is such that the receiving roll 22, which is, similarly to the aforementioned, made of a fluororesin-coated corrosion-resistant stainless steel and has a diameter of 14 cm, is provided with a concave groove 23, and that the opening peripheral edges of this concave groove 23 are blade portions. A side face of the rotary blade 24, which is made of a fluororesin-coated corrosion-resistant stainless steel and is a disk-shaped one-side-edge blade having a blade edge diameter of 7.5 cm, is disposed so as to almost contact with an inner side face of the concave groove 23. This is in the shear cut manner that the continuous sheet 10 is cut by the shear action in a state interposed between the side face of the disk-shaped rotary blade 24 and the opening peripheral edge of the concave groove 23.

As is illustrated in FIG. 1, a nozzle 26 for spraying of water which is an adhesion-preventing liquid is disposed near the disk-shaped rotary blade 24. By the spraying of water from the spraying nozzle 26 to the disk-shaped rotary blade 24, the material of the continuous sheet 10 is prevented from adhering to the disk-shaped rotary blade 24, whereby the sharpness of the disk-shaped rotary blade 24 is maintained.

As to the continuous sheet 10 having been slit off widthwise by passing the slitter 20, its running direction is changed from the horizontal direction to the vertical downward direction along the receiving roll 22.

<Cutter>:

The continuous sheet 10 fall-running vertically downward is supplied to the cutter 30.

As is illustrated in FIG. 3(a) in detail, the cutter 30 has a straight fixed blade 32 which is horizontally supported crossing widthwise the continuous sheet 10 on one face side of the continuous sheet 10. In addition, the cutter 30 has: a revolution body 34 which is disposed in a position facing the fixed blade 32 and crosses widthwise the continuous sheet 10 on the opposite face side of the continuous sheet 10 and rotationally drives along the running direction of the continuous sheet 10; and a plate-shaped rotary blade 36 which projects diameterwise from the outer periphery of the revolution body 34 and is disposed spirally along this outer periphery of the revolution body 34 with a little inclination to the axial directions of the revolution body 34. Because the plate-shaped rotary blade 36 is provided on the outer periphery of the revolution body 34 in this way, this rotary blade can rotate on the opposite face side of the continuous sheet 10, around an axis (not shown in the drawing) (crossing widthwise the continuous sheet 10) as a rotational center, and along the running direction of the continuous sheet 10.

The fixed blade 32 is made of a fluororesin-coated corrosion-resistant stainless steel and is 7 cm in blade-edge-wise width. The revolution body 34 is made of a fluororesin-coated corrosion-resistant stainless steel and is 20 cm in outer diameter. The plate-shaped rotary blade 36 is made of a fluororesin-coated corrosion-resistant stainless steel and is 7 cm in length of projection from the outer periphery of the revolution body 34.

With the revolution of the revolution body 34, the edge of the fixed blade 32 and the edge of the plate-shaped rotary blade 36 pass each other in a way of meshing with each other. Because the plate-shaped rotary blade 36 is spirally inclined, the position C of the meshing between the plate-shaped rotary blade 36 and the fixed blade 32 migrates gradually axiswise from an end side to the other end side. With this migration of the meshing position C, it follows that the continuous sheet 10 is cut in the meshing position C. The continuous sheet 10 contacts only with the fixed blade 32 and the plate-shaped rotary blade 36 on the periphery of the meshing position C and does not contact with such as the outer periphery of the revolution body 34 to thus adhere thereto.

Figure 3:
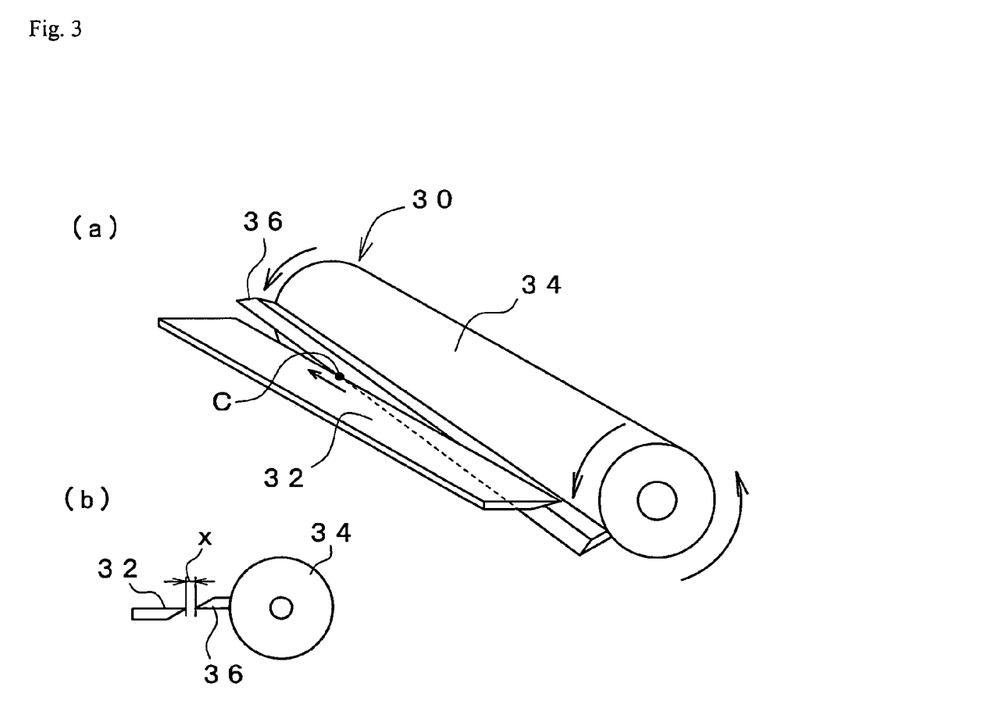
FIG. 3 is a perspective view (a) and a front view (b) illustrating the blade portion structure of the cutter.

Incidentally, as is illustrated in FIG. 3(*b*), a slight space, that is, a clearance x, is opened between the edge of the fixed blade 32 and the edge of the plate-shaped rotary blade 36. By appropriately adjusting this clearance x, the sharpness can be made good, or the durability of the fixed blade 32 and of the plate-shaped rotary blade 36 can be enhanced.

The cutting intervals lengthwise of the continuous sheet 10 can be changed according to relations of the setting intervals or number of the plate-shaped rotary blades 36 on the revolution body 34 and the number of revolutions of the revolution body 34 with the running speed of the continuous sheet 10.

As is illustrated in FIG. 1, nozzles 38 (similar to the aforementioned) for spraying an adhesion-preventing liquid are set obliquely above the fixed blade 32 and obliquely above the revolution body 34, whereby the continuous sheet 10 is prevented from adhering to the fixed blade 32 and the plate-shaped rotary blade 36. The spraying nozzle 38, as set obliquely above the revolution body 34, sprays water to the plate-shaped rotary blade 36 from the outside of the range where the plate-shaped rotary blade 36 rotationally migrates.

As is illustrated in FIG. 2, the continuous sheet 10 having been widthwise divided by the slitter 20 is cut off also lengthwise every definite interval by the cutter 30. As a result, approximately rectangular cut pieces 12 are obtained. In FIG. 2, the cut pieces 12 are indicated in a perfectly rectangular shape. However, the cut pieces 12 having been cut by the inclined plate-shaped rotary blade 36 of the cutter 30 have a possibility of being a shape near a parallelogram or rhombus shaped as a result of a little warping of the rectangle.

As is illustrated in FIG. 1, if the continuous sheet 10 migrating vertically downward is cut off lengthwise by the cutter 30, then the resultant cut pieces 12 fall due to their own weights.

<Continuous Disintegrator>:

As is illustrated in FIG. 1, the screw extrusion type continuous disintegrator 40 is set below the cutter 30.

The continuous disintegrator 40 has at its top an inlet 42 for injecting the material to be treated. The injection inlet 42 has such a shape and size that the cut pieces 12 being supplied from the cutter 30 can surely be injected by falling. For example, this injection inlet has a rectangular opening of a size of 50 cm×50 cm.

Below the injection inlet 42, there are provided: a cylindrical barrel portion 44; and a screw portion 46 rotating inside this barrel portion 44. The screw portion 46 is rotationally driven by such as a motor. At the front end of the barrel portion 44, there is provided an perforated extrusion plate 48 through which a plurality of small perforations penetrate.

The cut pieces 12 having been supplied to the injection inlet 42 migrate forward while being stirred and disintegrated inside the barrel portion 44 with the revolution of the screw portion 46 and, finally, are extruded from the perforated extrusion plate 48 and thereby formed into hydrogel particles 14 and discharged from the continuous disintegrator 40. The particle diameters of the resultant hydrogel particles 14 are considerably smaller than the perforation diameters of the perforated extrusion plate 48. For example, there is a case where the hydrogel particles 14 obtained by the extrusion from the perforated extrusion plate 48 having a perforation diameter of 16 mm have a particle diameter of about 2.5 mm.

Figure 4:
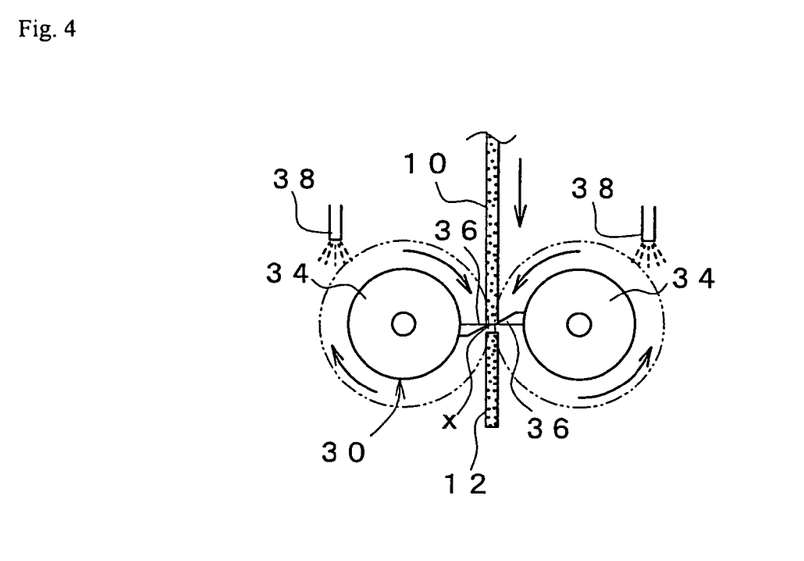
FIG. 4 is a sectional view illustrating another mode for carrying out the cutter.

[Example of Modification of Cutter]:

Fog. 4 illustrates the structure of a cutter 30 different from the aforementioned mode for carrying out the present invention.

The revolution body 34 and the plate-shaped rotary blade 36 are disposed on both the surface and back face sides of the continuous sheet 10 migrating vertically downward. The nozzle 38 for spraying the adhesion-preventing liquid is also set on both face sides.

Because both the right and left revolution bodies 34 revolve along the running direction of the continuous sheet 10, it follows that they revolve in the directions reverse to each other.

As to the plate-shaped rotary blades 36 having been provided to each of the right and left revolution bodies 34 with an inclination to the axial directions of these revolution bodies, the right and left plate-shaped rotary blades 36 pass each other in a way of meshing with each other in the position of the continuous sheet 10 therebetween. The continuous sheet 10 is cut by the migration of the position C of the meshing between the right and left plate-shaped rotary blades 36 from an end side to the other end side of the continuous sheet 10.

In this mode for carrying out the present invention, because both blades to cut the continuous sheet 10 are the plate-shaped rotary blades 36, their migration speeds relative to each other are large, so that the continuous sheet 10 can be cut rapidly and strongly.

Also in this mode for carrying out the present invention, similarly to the aforementioned mode for carrying out the present invention as is illustrated in FIG. 3(*b*), a clearance x is opened between edges of a pair of plate-shaped rotary blades 36, 36 meshing with each other. Particularly, because both the plate-shaped rotary blades 36, 36 rotationally migrate, it is important to appropriately adjust the clearance x.

Figure 6:
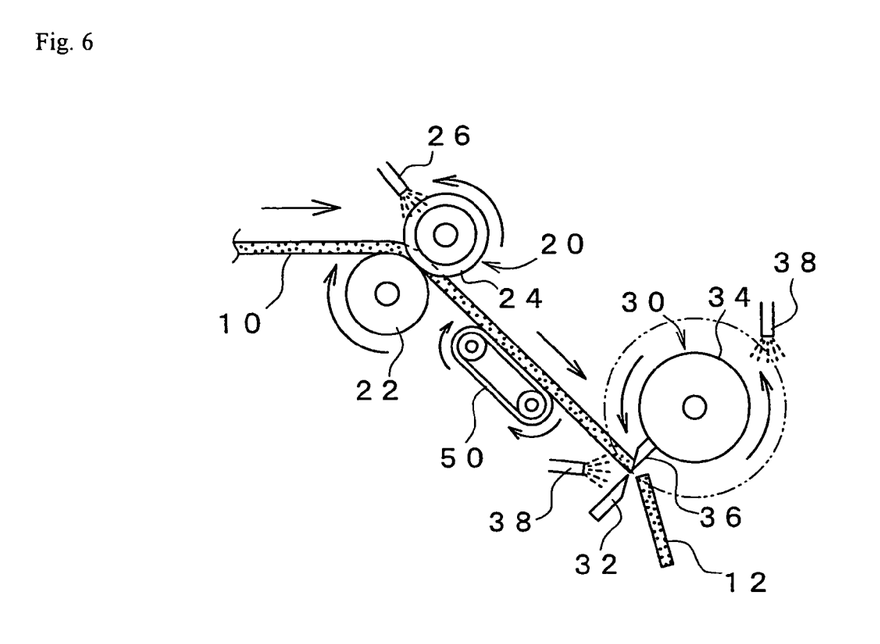
FIG. 6 is a constitutional view of a cutting operation section illustrating another mode for carrying out the present invention.

[Another Mode for Carrying Out the Present Invention]:

The mode for carrying out the present invention as is illustrated in FIG. 6 differs from the aforementioned mode for carrying out the present invention as to the disposition structure of the slitter 20 and cutter 30.

The continuous sheet 10 having been slit lengthwise by passing the slitter 20 is caused to run not vertically downward but obliquely downward. A conveyor 50 is set on the downstream side of the slitter 20, and the conveying surface of the conveyor 50 is oriented obliquely downward. The conveying surface of the conveyor 50 is treated by such as fluororesin processing to thereby reduce its adhesion to the continuous sheet 10.

The cutter 30 is set obliquely below the conveyor 50 on its downstream side. The continuous sheet 10 is cut off lengthwise with the cutter 30, and then the resultant cut pieces 12 freely fall. As a result, they at first migrate obliquely downward due to the inertia by the running until then and due to the gravitational action to thus separate from the fixed blade 32 and plate-shaped rotary blade 36 of the cutter 30, and thereafter fall vertically downward due to the gravitational action. Accordingly, it is desirable that the injection inlet 42 of the continuous disintegrator 40 is disposed according to the falling course of the cut pieces 12.

DETAILED DESCRIPTION OF THE PREFERRED EMBODIMENTS

Hereinafter, the present invention is more specifically illustrated by the following Examples of some preferred embodiments. However, the present invention is not limited to them in any way.

Specific arts for carrying out the present invention and the evaluation results of their performances are shown below.

[Methods for Measurement of Performances]:

<Absorption Capacity (GV)>:

The absorption capacity without load is measured. An amount of 0.2 g of sample was uniformly placed into a nonwoven-fabric-made bag (60 mm×60 mm) and then immersed into a 0.9 weight % aqueous sodium chloride solution (physiological saline solution). After 30 minutes, the bag was pulled up and then drained of water at 250×9.81 m/s² (250 G) with a centrifugal separator for 3 minutes, and then the weight W1 (g) of the bag was measured. In addition, the same procedure as the above was carried out without water-absorbent resin, and the resultant weight W0 (g) was measured. Then, the absorption capacity without load, GV, was measured from these weights W1 and W0 in accordance with the following equation:

$$GV(g/g)=[(W1-W0)/\text{weight (g) of sample}]-1$$

<Water-extractable Component Content>:

Into a plastic receptacle of 250 ml in capacity having a lid, 184.3 g of 0.9 weight % aqueous NaCl solution (physiological saline solution) was weighed out. Then, 1.00 g of sample was added to this aqueous solution, and they were stirred for 16 hours, whereby extractable components were extracted from the resin to measure the amount of the extractable components.

<Saline Flow Conductivity SFC>:

Its measurement method was carried out in accordance with the saline flow conductivity (SFC) test of JP-A-509591/1997 (Kohyo).

EXAMPLE 1

<Production of Hydrogel Sheet>:

A monomer liquid was prepared by stir-mixing the following solutions together at predetermined flow rates.

A 48.5 weight % aqueous sodium hydroxide solution 73.5 g/s.

A 53.9 weight % aqueous acrylic acid solution 169.2 g/s.

A solution 1.43 g/s prepared by dissolving 77.4 weight parts of a 50 weight % aqueous acrylic acid solution, 0.781 weight part of 2-hydroxymethyl-2-methylpropiophenone, 0.849 weight part of a 46 weight % aqueous pentasodium diethylenetriaminepentaacetate solution, and 21.0 weight parts of polyethylene glycol diacrylate (average molecular weight: 523) together.

The temperature of the resultant monomer liquid was stable at about 95° C.

The monomer liquid was continuously supplied to a supply pipe line and continuously stirred in this supply pipe line, and then a 3 weight % aqueous sodium persulfate solution was caused to flow into this monomer liquid at a flow rate of 3.40 g/s to thereby form a mixed liquid. This mixed liquid had a monomer concentration of 45 weight % and a neutralization degree of 70 mol %.

Used as the belt polymerization device was a device in which: there was provided an endless belt which had an effective length of 7.0 m and a width of 1.5 m and of which the surface was coated with a fluororesin; and a UV lamp was set above the belt; and the bottom and the periphery were heated and thermally insulated at about 100° C.; and, in a central portion, there was set an aspirator pipe to recover vaporized water.

The aforementioned mixed liquid was supplied to this belt polymerization device so that the monomer thickness would be 5.6 mm, whereby polymerization was continuously carried out at a belt speed of 4.5 m/min. Obtained was a band-shaped hydrogel polymer sheet which had a solid component content of 60 weight %, a sheet width of about 80 cm after shrinkage, a sheet thickness of 2 to 20 mm (such a dispersion in thickness occurs because there are wrinkles having been caused during the shrinkage after the expansion and because these wrinkles may lie on top of each other), and a surface temperature of about 70° C.

<Production of Cut Pieces>:

The resultant band-shaped continuous sheet of a hydrogel polymer was immediately supplied to a slitter by a conveying belt. The slitter has a basic structure as illustrated in FIG. 5(*a*). Score cutter type rotary blades having a diameter of 75 mm and a thickness of 2 mm are disposed in three places at intervals and, opposite to these rotary blades, there is provided a receiving roll having a diameter of 140 mm. The continuous sheet was widthwise divided into four at widths of 20 cm under an air pressure of 0.40 MPa as applied to the score cutter blades.

The continuous sheets having been widthwise divided by the slitter were supplied to a cutter in a state hung down vertically due to their own weights with their running direction changed along the receiving roll.

The cutter has a basic structure as illustrated in FIG. 3, namely, the following: a fixed blade having a thickness of 20 mm and a length of 70 mm up to its blade edge; a roll-shaped revolution body having a diameter of 200 mm; and a spiral-plate-shaped rotary blade being provided on the outer periphery of the revolution body and having a thickness of 14 mm, a length of 70 mm up to its blade edge, and a width of 1.4 m. The plate-shaped rotary blade is provided in only one place of the revolution body. The clearance between the fixed blade and the rotary blade is adjusted to about 0.01 mm. This cutter is a semisynchronous type rotary cutter.

The continuous sheet was continuously cut every 15 cm lengthwise of the continuous sheet at 30 rpm in number of revolutions of the revolution body. Obtained were cut pieces almost in the shape of a rectangle of 20 cm×15 cm. There was seen no adhesion of the continuous sheet to the score cutter blades or receiving roll of the slitter or to the fixed blade, rotary blade, or revolution body of the cutter. There was seen no re-adhesion between cut sections of the cut pieces, either. However, when the operation was carried out for a long time, there were a little seen the adhesion of the continuous sheet to such as cutting blades and the re-adhesion between cut sections of the cut pieces. However, in practical use, there was no problem.

<Continuous Disintegration>:

The cut pieces having been produced by the cutter were disintegrated by a meat chopper of 16 mm in perforation diameter of extrusion perforations, whereby hydrogel particles were obtained.

Used as the meat chopper was Meat Chopper 72-Model (produced by Hiraga Kosakusho: treatment ability at 105 rpm in number of screw revolutions=about 6 t/hr). This device is a screw extrusion type continuous disintegrator. The injection inlet of the meat chopper is about 50 cm×about 50 cm and can surely receive the cut pieces having been produced from the previous step.

By setting the number of screw revolutions for 15 rpm, the ability to treat the hydrogel particles by the disintegration followed by discharge with the meat chopper became 0.86 t/hr. The supply amount of the cut pieces being supplied from the cutter to the meat chopper was 0.66 t/hr. This satisfies the condition of (amount of supply to meat chopper)≦(disintegrating and discharging abilities).

The meshing state in the meat chopper was so good that no stagnation occurred, either, and the state of the discharge was also so good that the continuous discharge was made. No stagnation in a hopper of the injection portion was seen, either.

<Production of Water-absorbent Resin Particles>:

The hydrogel particles having been discharged from the meat chopper was dried with hot air of 180° C. for 40 minutes to obtain a dried material, which was then pulverized by a roll mill, thus obtaining particulate water-absorbent resin particles (1). Sieves were used to classify particles in the particle diameter range of 300 to 600 μm from the water-absorbent resin particles (1), and then the physical properties of the classified particles were measured. The absorption capacity was 42 (g/g), and the water-extractable component content was 14 weight %. Subsequently, heat treatment with a system of butanediol/propylene glycol/water/24% sodium hydroxide was carried out at 212° C. by a mortar mixer. The physical properties of the treated water-absorbent resin particles were 30 (g/g) in absorption capacity and 40 in saline flow conductivity (SFC). It was confirmed that the resultant water-absorbent resin particles had practically sufficient performances as water-absorbent resin particles.

EXAMPLE 2

<Production of Cut Pieces>:

A continuous sheet composed of a hydrogel sheet having been produced by the same process as of Example 1 was supplied to a slitter by a conveying belt.

The slitter being used is the same score cutter as of Example 1, but its score cutter blades and receiving roll are coated with a fluororesin. The continuous sheet was widthwise divided into four at widths of 20 cm in the same way as of Example 1.

The continuous sheet hung down vertically from the slitter was supplied to a cutter.

The cutter has basically the same structure as of Example 1, but its fixed blade and rotary blade are coated with a fluororesin. The continuous sheet was continuously cut every 15 cm lengthwise of the continuous sheet at 30 rpm in number of revolutions of the revolution body. Obtained were cut pieces almost in the shape of a rectangle of 20 cm×15 cm. There was seen no adhesion of the continuous sheet to the slitter or to the cutter. There was seen no re-adhesion between cut sections of the cut pieces, either. Also after the operation had been carried out for a long time, the aforementioned adhesion and re-adhesion were both very slight.

<Continuous Disintegration>:

The cut pieces were disintegrated by the same meat chopper as of Example 1, whereby hydrogel particles were obtained.

<Production of Water-absorbent Resin Particles>:

The hydrogel particles were treated by the same process as of Example 1, thus obtaining particulate water-absorbent resin particles (2). In the same way as of Example 1, particles in the particle diameter range of 300 to 600 μm were classified from the water-absorbent resin particles (2), and then the physical properties of the classified particles were measured. The absorption capacity was 42 (g/g), and the water-extractable component content was 14 weight %. Subsequently, the same heat treatment as of Example 1 was carried out. The physical properties of the resultant heat-treated material were 30 (g/g) in absorption capacity and 40 in SFC. Water-absorbent resin particles having physical properties as good as those of Example 1 were obtained.

EXAMPLE 3

<Production of Cut Pieces>:

A continuous sheet composed of a hydrogel sheet having been produced by the same process as of Example 1 was supplied to a slitter by a conveying belt.

The slitter being used was the same score cutter as of Example 1, but its rotary blades and receiving roll were coated with a fluororesin. Spraying nozzles to spray the rotary blades with water were used. The amount of water being sprinkled was in the range of 5 to 10 cc/min.

The continuous sheet was widthwise divided into four at widths of 20 cm in the same way as of Example 1.

The continuous sheet hung down vertically from the slitter was supplied to a cutter.

The cutter has basically the same structure as of Example 1, but its fixed blade and rotary blade are coated with a fluororesin. Each of the fixed blade and the rotary blade was provided with a spraying nozzle to spray water thereto and a unit to supply water to this spraying nozzle. The amount of water being sprinkled was in the range of 5 to 10 cc/min. The continuous sheet was continuously cut every 15 cm lengthwise of the continuous sheet at 30 rpm in number of revolutions of the revolution body. Obtained were cut pieces almost in the shape of a rectangle of 20 cm×15 cm.

There was seen no adhesion of the continuous sheet to the slitter or to the cutter. There was seen no re-adhesion between cut sections of the cut pieces, either. Also after the operation had been carried out for a long time, neither the aforementioned adhesion nor re-adhesion was seen.

<Continuous Disintegration>:

The cut pieces were disintegrated by the same meat chopper as of Example 1 under the same treatment conditions as of Example 1, whereby hydrogel particles were obtained.

<Production of Water-absorbent Resin Particles>:

The hydrogel particles were treated by the same process as of Example 1, thus obtaining particulate water-absorbent resin particles (3). In the same way as of Example 1, particles in the particle diameter range of 300 to 600 μm were classified from the water-absorbent resin particles (3), and then the physical properties of the classified particles were measured. The absorption capacity was 42 (g/g), and the water-extractable component content was 14 weight %. Subsequently, the same heat treatment as of Example 1 was carried out. The physical properties of the resultant heat-treated material were 30 (g/g) in absorption capacity and 40 in SFC. Water-absorbent resin particles having physical properties as good as those of Example 1 were obtained.

EXAMPLE 4

<Production of Cut Pieces>:

A continuous sheet composed of a hydrogel sheet having been produced by the same process as of Example 1 was supplied to a slitter by a conveying belt.

The slitter being used was the same score cutter as of Example 1, by which the continuous sheet was widthwise divided into four at widths of 20 cm.

The continuous sheet hung down vertically from the slitter was supplied to a cutter.

The cutter has a basic structure as illustrated in FIG. 3. Revolution bodies having a diameter of 200 mm and spiral rotary blades having a thickness of 14 mm, a length of 70 mm up to its blade edge, and a width of 1.4 m are disposed right and left at an interval. The rotary blades are provided in a number of one on each revolution body. The clearance between the rotary blades is adjusted to about 0.01 mm. This cutter is a full-synchronous type rotary cutter. The numbers of revolutions of the revolution bodies were set for 30 rpm, and the continuous sheet was continuously cut every 15 cm lengthwise of the continuous sheet. Obtained were cut pieces almost in the shape of a rectangle of 20 cm×15 cm. There was seen no adhesion of the gel sheet to such as the rotary blades or the revolution bodies, and there was seen no re-adhesion between cut sections, either. When the operation was carried out for a long time, the aforementioned adhesion or re-adhesion occurred a little. However, in practical use, there was no problem.

<Continuous isintegration>:

The cut pieces were disintegrated by the same meat chopper as of Example 1 under the same treatment conditions as of Example 1, whereby hydrogel particles were obtained.

<Production of Water-absorbent Resin Particles>:

The hydrogel particles were treated by the same process as of Example 1, thus obtaining particulate water-absorbent resin particles (4). In the same way as of Example 1, particles in the particle diameter range of 300 to 600 μm were classified from the water-absorbent resin particles (4), and then the physical properties of the classified particles were measured. The absorption capacity was 42 (g/g), and the water-extractable component content was 14 weight %. Subsequently, the same heat treatment as of Example 1 was carried out. The physical properties of the resultant heat-treated material were 30 (g/g) in absorption capacity and 40 in SFC. Water-absorbent resin particles having physical properties as good as those of Example 1 were obtained.

EXAMPLE 5

<Production of Cut Pieces>:

A continuous sheet composed of a hydrogel sheet having been produced by the same process as of Example 1 was supplied to a slitter by a conveying belt.

The slitter being used was a device having the same fluororesin-coated score cutter as of Example 2, by which the continuous sheet was widthwise divided into four at widths of 20 cm.

The continuous sheet hung down vertically from the slitter was supplied to a cutter.

The cutter is a fluororesin-coated full-synchronous type rotary cutter having the same structure as of Example 4. The continuous sheet was continuously cut every 15 cm lengthwise of the continuous sheet at 30 rpm in numbers of revolutions of the revolution bodies. Obtained were cut pieces almost in the shape of a rectangle of 20 cm×15 cm. There was seen no adhesion of the gel sheet to such as the rotary blades or the revolution bodies, and there was seen no re-adhesion between cut sections, either. Also after the operation had been carried out for a long time, the aforementioned adhesion and re-adhesion were very slight.

<Continuous Disintegration>:

The cut pieces were disintegrated by the same meat chopper as of Example 1 under the same treatment conditions as of Example 1, whereby hydrogel particles were obtained.

<Production of Water-absorbent Resin Particles>:

The hydrogel particles were treated by the same process as of Example 1, thus obtaining particulate water-absorbent resin particles (5). In the same way as of Example 1, particles in the particle diameter range of 300 to 600 μm were classified from the water-absorbent resin particles (5), and then the physical properties of the classified particles were measured. The absorption capacity was 42 (g/g), and the water-extractable component content was 14 weight %. Subsequently, the same heat treatment as of Example 1 was carried out. The physical properties of the resultant heat-treated material were 30 (g/g) in absorption capacity and 40 in SFC. Water-absorbent resin particles having physical properties as good as those of Example 1 were obtained.

EXAMPLE 6

<Production of Cut Pieces>:

A continuous sheet composed of a hydrogel sheet having been produced by the same process as of Example 1 was supplied to a slitter by a conveying belt.

The slitter has a basic structure as illustrated in FIG. 5(b), namely, the following: shear cutter upper blades which are fluororesin-coated disk-shaped rotary blades having a diameter of 75 mm; fluororesin-coated shear cutter lower blades of 150 mm in diameter having knife axles (receiving roll having concave grooves); and units to sprinkle water on these shear cutters (sprinkling amount: 5 to 10 cc/min). While the upper and lower blades were made to lightly contact with each other and while the pressure of this contact was kept constant, the continuous sheet was widthwise divided into four at widths of 20 cm.

The continuous sheet hung down vertically from the slitter was supplied to a cutter.

The cutter is a fluororesin-coated full-synchronous type rotary cutter having the same structure as of Example 4. There are also set the following: nozzles to spray water; and units to supply water. The amount of water being sprinkled was in the range of 5 to 10 cc/min.

The continuous sheet was continuously cut every 15 cm lengthwise of the continuous sheet at 30 rpm in numbers of revolutions of the revolution bodies. Obtained were cut pieces almost in the shape of a rectangle of 20 cm×15 cm. There was seen no adhesion of the gel sheet to such as the rotary blades or the revolution bodies, and there was seen no re-adhesion between cut sections, either. This was the same also after the operation had been carried out for a long time.

<Continuous Disintegration>:

The cut pieces were disintegrated by the same meat chopper as of Example 1 under the same treatment conditions as of Example 1, whereby hydrogel particles were obtained.

<Production of Water-absorbent Resin Particles>:

The hydrogel particles were treated by the same process as of Example 1, thus obtaining particulate water-absorbent resin particles (6). In the same way as of Example 1, particles in the particle diameter range of 300 to 600 μm were classified from the water-absorbent resin particles (6), and then the physical properties of the classified particles were measured. The absorption capacity was 42 (g/g), and the water-extractable component content was 14 weight %. Subsequently, the same heat treatment as of Example 1 was carried out. The physical properties of the resultant heat-treated material were 30 (g/g) in absorption capacity and 40 in SFC. Water-absorbent resin particles having physical properties as good as those of Example 1 were obtained.

COMPARATIVE EXAMPLE 1

<Production of Cut Pieces>:

A continuous sheet composed of a hydrogel sheet having been produced by the same process as of Example 1 was supplied to a slitter by a conveying belt.

The slitter being used was the same fluororesin-coated score cutter as of Example 2, by which the continuous sheet was widthwise divided into four at widths of 20 cm in the same way as of Example 1.

One (width: about 20 cm) of the four sheets, into which the continuous sheet had been divided, was cut by an SGE-220-model sheet pelletizer of 22 cm in effective cutting width (produced by Horai Co., Ltd.). This sheet pelletizer is a device to cut a sheet material by slit cutting which is carried out with a lengthwise cutting blade composed of a roll cutter and by widthwise cutting which is carried out with a fixed blade and a straight-plate-shaped rotary blade that is provided on a revolution body and extends in its axial directions wherein these fixed blade and rotary blade are disposed adjacently to the lower portion of the above lengthwise cutting blade. The number of revolutions of the widthwise cutting rotary blade was set for 250 rpm, and the clearance between the rotary blade and the fixed blade was set in the range of about 0.05 to about 0.08 mm. In order to prevent the adhesion, water spraying was carried out to both the lengthwise and widthwise cutting portions in a sprinkling amount of 40 to 50 cc/min.

However, there occurred problems such that: a part of the continuous sheet adhered to such as the rotary blade for widthwise cutting; or the re-adhesion between cut sections of the cut pieces occurred; or the clearance between the rotary blade and a hood portion surrounding the outer periphery of the rotary blade was clogged up with the cut pieces. Even if the adhered materials were removed to restart the operation, the clogging immediately occurred. Therefore, the continuous sheet could not continuously be cut.

<Disintegration and Production of Water-absorbent Resin Particles>:

Ball-shaped hydrogel lumps (size: about 5 mm×about 60 mm) composed of the continuous sheet material, having been obtained until the discontinuance of the operation, were disintegrated by the same meat chopper as of Example 1, and then water-absorbent resin particles were produced by the same process as of Example 1. As to particles in the particle diameter range of 300 to 600 μm in the resultant water-absorbent resin particles (7), the absorption capacity was 40 (g/g), and the water-extractable component content was 18 weight %. Subsequently, the same heat treatment as of Example 1 was carried out. The physical properties of the resultant heat-treated material were 29 (g/g) in absorption capacity and 20 in SFC. Thus, it has been demonstrated that, unless the cutting operation can successfully be carried out, inferior results are unfavorably provided with regard to the water absorption performances.

EXAMPLE 7

The production and continuous disintegration of the cut pieces and the production of the water-absorbent resin particles were carried out in the same way as of Example 1 except that the following production conditions were changed.

As to the same meat chopper as of Example 1, its number of screw revolutions was set for 75 rpm. As a result, the disintegrating and discharging treatment abilities of the meat chopper become 4.29 t/hr relative to 0.66 t/hr in amount of the cut pieces being supplied to the meat chopper. This sufficiently satisfies the condition of (supply amount)≦(disintegrating and discharging abilities). The objective hydrogel particles were obtained without stagnation of the cut pieces even temporarily at the injection inlet of the meat chopper.

As to the water-absorbent resin particles (8) in the particle diameter range of 300 to 600 μm having been obtained by the same treatment as of Example 1, the absorption capacity was 43 (g/g), and the water-extractable component content was 12 weight %. Subsequently, the same heat treatment as of Example 1 was carried out. The physical properties of the resultant heat-treated material were 31 (g/g) in absorption capacity and 43 in SFC. Water-absorbent resin particles having higher water absorption performances than those of Example 1 were obtained.

COMPARATIVE EXAMPLE 2

The production and continuous disintegration of the cut pieces and the production of the water-absorbent resin particles were carried out in the same way as of Example 1 except that the following production conditions were changed.

As to the same meat chopper as of Example 1, its number of screw revolutions was set for 5 rpm. As a result, the disintegrating and discharging treatment abilities of the meat chopper become 0.29 t/hr relative to 0.66 t/hr in amount of the cut pieces being supplied to the meat chopper. This is (supply amount)≦(disintegrating and discharging abilities) and does not satisfy the condition of (supply amount)≦(disintegrating and discharging abilities). Thus, the disintegrating and discharging amounts became too small when compared with the supply amount of the continuous sheet. Therefore, the state of the meshing in the meat chopper was so bad as to cause a sate where the cut pieces stagnated at the injection inlet. The stagnation in the meat chopper also became too long, so that the hydrogel particles were obtained in a state kneaded in the meat chopper.

As to the water-absorbent resin particles (9) in the particle diameter range of 300 to 600 μm having been obtained by the same treatment as of Example 1, the absorption capacity was 41 (g/g), and the water-extractable component content was 17 weight %. Subsequently, the same heat treatment as of Example 1 was carried out. The physical properties of the resultant heat-treated material were 29 (g/g) in absorption capacity and 30 in SFC. The water absorption performances are inferior to those of Example 1.

COMPARATIVE EXAMPLE 3

The production and continuous disintegration of the cut pieces and the production of the water-absorbent resin particles were carried out in the same way as of Example 1 except that the following production conditions were changed.

The continuous sheet having a sheet width of about 80 cm and a sheet thickness of 2 to 20 mm was continuously supplied to the same meat chopper as of Example 1, with the continuous sheet left as it was in a hem-uncut state without being passed through the slitter or cutter. The number of screw revolutions was set for 50 rpm.

Because the disintegrating and discharging speeds were too fast when compared with the supply speed of the continuous sheet, the continuous sheet having continuously been injected became unfavorably torn off, so that the re-injection of the torn-off sheets could not be controlled. Therefore, the continuous operation became impossible.

EXAMPLE 8

Devices and steps common to Example 1 were basically adopted, and some of the device constitutions and steps were changed. Different portions are mainly described below.

<Production of Cut Pieces>:

A continuous sheet composed of a hydrogel sheet having been produced by the same process as of Example 1 was conveyed by a conveying belt without any slitter. Then, the continuous sheet in a state hung down vertically was supplied to a cutter. The cutter has basically a structure common to Example 1. Each of the fixed blade and the rotary blade was provided with a spraying nozzle to spray water thereto and a unit to supply water to this spraying nozzle. The amount of water being sprinkled was about 1,300 cc/min. The number of revolutions of the rotary blade was set for 30 rpm, and the continuous sheet was continuously cut every 15 cm lengthwise of the continuous sheet. Obtained as a result were cut pieces in the shape of a rectangle of about 80 cm×about 15 cm.

There was seen no adhesion of the continuous sheet to the cutter. Even when the operation was carried out for a long time, the adhesion was not seen at all. The sharpness of the cutting by the rotary blade and the fixed blade did not decrease with the passage of time, either.

<Continuous Disintegration>:

The cut pieces having been obtained from the previous step were disintegrated by the same meat chopper as of Example 1. Its number of screw revolutions was set for 85 rpm. The amount of the cut pieces being supplied to the meat chopper was 0.74 t/hr. This supply amount is the sum total of 0.66 t/hr in supply amount of the hydrogel sheet having been supplied to the cutting step and 0.08 t/hr in supply amount of the water having been sprinkled in the cutting step. The ability to treat the hydrogel particles by the disintegration and discharge with the meat chopper is 4.86 t/hr. This sufficiently satisfies the condition of (supply amount)≦(disintegrating and discharging abilities). The treatment could be carried out smoothly without stagnation of the cut pieces even temporarily at the injection inlet of the meat chopper. The objective hydrogel particles were successfully obtained.

<Production of Water-absorbent Resin Particles>:

The hydrogel particles having been obtained from the previous step were subjected to the treatment common to Example 1, thus obtaining water-absorbent resin particles (10). As to a group of particles in the particle diameter range of 300 to 600 μm in the resultant water-absorbent resin particles (10), the absorption capacity was 43 (g/g), and the water-extractable component content was 12 weight %, and the SFC was 43. They are water-absorbent resin particles which are more excellent in the water absorption performances than those of Example 1.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for production of hydrogel particles, which is a process for production of the hydrogel particles from a high-concentration hydrogel sheet and comprises:
   a step (a) of providing a cutting means and cutting a continuous sheet of a crosslinked high-concentration hydrogel polymer of 50 to 80 weight % in solid component concentration every 10 to 100 cm lengthwise of the continuous sheet while running it lengthwise, thereby obtaining cut pieces, said step (a) including a step (a-3) of supplying a medium to the cutting means for cutting the continuous sheet, wherein the medium is selected from the group consisting of water, warm water, and water vapor; and
   a step (b) of continuously supplying the cut pieces (obtained from the step (a)) to a continuous disintegrator to continuously carry out disintegration and discharge under conditions where the supply amount of the cut pieces and the disintegrating and discharging abilities of the continuous disintegrator satisfy (supply amount) ≦ (disintegrating and discharging abilities), thereby obtaining the hydrogel particles.

2. A process according to claim 1 for production of hydrogel particles, wherein, in the step (a), the continuous sheet is cut off lengthwise by meshing between a fixed blade and a rotary blade, wherein the fixed blade is fixed and disposed crossing widthwise on one face side of the continuous sheet, and wherein the rotary blade rotates on the opposite face side of the continuous sheet, around a widthwise crossing axis as a rotational center, and along the running direction of the continuous sheet.

3. A process according to claim 1 for production of hydrogel particles, wherein the step (a) includes: a step (a-1) of cutting the continuous sheet off widthwise into widths of 10 to 100 cm with a rotary blade that rotates within a plane along the running direction of the continuous sheet; and a step (a-2) of cutting the continuous sheet (having been cut off widthwise) off lengthwise to thereby obtain the cut pieces of 10 to 100 cm in widthwise size and 10 to 100 cm in lengthwise size.

4. A process according to claim 3 for production of hydrogel particles, wherein, in the step (a-1), the cutting is carried out in a score cut manner.

5. A process according to claim 1 for production of hydrogel particles, wherein the step (b) uses a screw extrusion type disintegrator as the continuous disintegrator.

6. A process according to claim 1 for production of hydrogel particles, wherein the step (a) uses, as a cutter, a cutter having a constitutional member including a cutting blade for cutting the continuous sheet, wherein the constitutional member is subjected to a treatment for prevention of adhesion of the hydrogel.

7. A process according to claim 1, wherein the medium is supplied in an amount effective to inhibit adhesion of the hydrogel polymer to the cuffing means.

8. A process according to claim 7, wherein the medium is warm water at a temperature of 60° C. to 90° C.

9. A process according to claim 1, wherein the medium is supplied to the cutting means in an amount effective to prevent overheating and distortion of the cutting means.

* * * * *